United States Patent [19]

Ashby et al.

[11] Patent Number: 4,838,989

[45] Date of Patent: Jun. 13, 1989

[54] LASER-DRIVEN FUSION ETCHING PROCESS

[75] Inventors: Carol I. H. Ashby, Edgewood; Paul J. Brannon; James B. Gerardo, both of Albuquerque, all of N. Mex.

[73] Assignee: The United States of America as represented by the United States Department of Energy, Washington, D.C.

[21] Appl. No.: 89,206

[22] Filed: Aug. 25, 1987

[51] Int. Cl.$^4$ .................................................. B44C 1/22
[52] U.S. Cl. .................................. 156/628; 156/635; 156/643; 156/654; 427/53.1; 427/56.1; 430/297; 430/299
[58] Field of Search ............... 156/635, 643, 654, 628; 427/53.1, 55.1; 430/297, 299

[56] References Cited

U.S. PATENT DOCUMENTS

| | | | |
|---|---|---|---|
| 3,489,564 | 1/1970 | Schaefer | 96/36 |
| 3,520,685 | 7/1970 | Schaefer | 96/36 |
| 3,637,381 | 1/1972 | Hallman et al. | 430/297 |
| 4,478,677 | 10/1984 | Chen et al. | 156/635 |
| 4,490,211 | 12/1984 | Chen et al. | 156/643 |
| 4,536,252 | 8/1985 | McDonald et al. | 156/662 |

OTHER PUBLICATIONS

Kaminow, Ramaswamy, Schmidt, and Turner, "Lithium Niobate Ridge Waveguide Modulator", *Appl. Phys. Letters*, vol. 24, No. 12, 06/15/74, pp. 622-624.

Chen, Marom, and Lee, "Geodesic Lenses in Single-Mode LiNbO$_3$ Waveguides", *Appl. Phys. Letters*, vol. 31, No. 4, 08/15/77, pp. 263-265.

Lee and Lu, "CF$_4$ Plasma Etching on LiNbO$_3$", *Appl. Phys. Lett.*, vol. 35, No. 10, 11/15/79, pp. 756-758.

Sopori, Phillips, and Chang, "Efficient Optical WaveguideCoupler", *Applied Optics*, vol. 19, No. 5, 3/1/80, pp. 790-801.

Jackel, Howard, Hu, Lyman, "Reactive Ion Etching of LiNbO$_3$", *Appl. Phys. Lett.*, vol. 38, No. 11, 6/1/81, pp. 907-909.

Chapman, "Argon & Reactive Ion Beam Etching for SAW Devices", *Vacuum*, vol. 34, Nos. 3-4, 1984, pp. 417-424.

Erlich, Tsao, Bozler, "Submicrometer Patterning by Projected Excimer-Laser-Beam Induced Chemistry", *J. Vac. Sci. Tech.*, vol. B3, Jan./Feb. 1985, pp. 1-8.

Ashby and Brannon, "Laser Driven Chemical Reaction for Etching LiNbO$_3$", *App. Phys. Lett.*, vol. 49, No. 8, 08/25/86, pp. 475-477.

*Primary Examiner*—Kenneth M. Schor
*Assistant Examiner*—Thi Dang
*Attorney, Agent, or Firm*—Anne D. Daniel; James H. Chafin; Judson R. Hightower

[57] ABSTRACT

The surfaces of solid ionic substrates are etched by a radiation-driven chemical reaction. The process involves exposing an ionic substrate coated with a layer of a reactant material on its surface to radiation, e.g. a laser, to induce localized melting of the substrate which results in the occurrance of a fusion reaction between the substrate and coating material. The resultant reaction product and excess reactant salt are then removed from the surface of the substrate with a solvent which is relatively inert towards the substrate. The laser-driven chemical etching process is especially suitable for etching ionic salt substrates, e.g., a solid inorganic salt such as LiNbO$_3$, such as used in electro-optical/acousto-optic devices. It is also suitable for applications wherein the etching process is required to produce an etched ionic substrate having a smooth surface morphology or when a very rapid etching rate is desired.

16 Claims, No Drawings

LASER-DRIVEN FUSION ETCHING PROCESS

The U.S. Government has rights to this invention pursuant to Contract No. DE-AC04-76DP00789 between the U.S. Department of Energy and the AT&T Technologies, Inc.

BACKGROUND OF THE INVENTION

This invention relates to processes for chemically etching solid surfaces, particularly chemical etching processes involving the application of intense light, e.g. a laser. In addition, the process of the invention is especially related to chemical etching techniques for etching ionic substances having relatively low solubility or low chemical reactivity, such as used in integrated optical and acoustical devices.

Etching techniques generally involve bringing the surface of a substrate into contact with an etchant or bombarding the surface of a substrate with ions. In these processes the treated portion of the substrate surface is removed, i.e., etched, by for example diffusion or dissolution within a solvent. Some processes for etching surfaces involve a step wherein the substrate is exposed to high-intensity light. In these processess, the high-intensity light is typically used either to generate a reactive species which will then act as an etchant or to directly etch the surface of vaporizing a reaction product formed during the process.

U.S. Pat. Nos. 3,489,564 and 3,520,685 disclose etching processes wherein a photo-decomposable fluorine compound, in contact with a silicon dioxide surface, is exposed to "activating radiation" energy to form a chemically reactive fluoro-species capable of etching the silicon dioxide surface. In U.S. Pat. No. 3,489,564 the photodecomposable fluorine compound is contained within an etching liquid and the silicon dioxide substrate is placed in contact with the liquid. Etching is performed by exposing the substrate/liquid etchant interface to a pattern of activating radiation. The surface of the substrate is etched at the interface by the resultant chemically reactive fluoro-species. In the process of U.S. Pat. No. 3,520,685 the photo-decomposable compound is contained within an organic polymeric solid film applied to the surface of the silicon dioxide substrate. The chemically reactive fluoro-species is produced by subjecting the interface between the substrate surface and the polymeric film to activating radiation through a metal mask in a humid atmosphere. The polymeric film is removed from the silicon dioxide subustrate by a solvent leaving behind a surface etched at the irradiated regions. Thus, in each of these processes the purpose of the activating radiation is to produce a chemically reactive species which is capable of etching the surface of a silicon dioxide substrate.

Another process wherein radiation is employed to produce a chemically reactive etching compound is disclosed in U.S. Pat. No. 4,536,252. In this process, a mixture of nitrogen oxide catalyst compounds and a fluoro compound selected from $NF_3$ and $N_2F_4$ by a continuous wave $CO_2$ laser to produce nitrosyl fluoride, FNO. The chemically reactive species, FNO, is brought into contact with a silicon substrate, reacting with the silicon to produce $SiF_4$ and nitrogen oxide thereby etching the substrate surface. FNO can either be produced directly within the etching chamber or optionally it can be produced in a side chamber and the resultant product gas then delivered to the etching chamber. The silicon substrate is exposed to the nitrosyl fluoride through a mask.

U.S. Pat. No. 4,478,677 also discloses a process wherein a laser is used to generate an active species for etching the surface of silicon dioxide or glass. In this process, a halogen gas is flowed into a chamber containing the substrate to be etched whereby the halogen gas wets the substrate surface. The wetted surface is then exposed through the gas to a pattern of light generated from a laser. The surface on which the light impinges is excited and the gas wetting the surface forms an active species capable of etching the surface in conformity with the pattern of light.

U.S. Pat. No. 4,490,211 discloses a method for etching metals on the surface of the substrate by using an excimer laser to vaporize the products formed by a spontaneous reaction between the metal and the halogen gas. In this process, the intended purpose of thin laser is not to form a chemically reactive etching species. Instead, the laser is used to directly etch the surface of the metal film by removing the product from the reaction between the metal surface and the halogen gas.

In each of these etching processes, activating radiation or high-intensity lasers are used to produce a chemically reactive species or to vaporize reaction products. Furthermore, these processes are directed to the etching of certain specific substrates such as glass, Si, $SiO_2$ or metal films.

SUMMARY OF THE INVENTION

An object of this invention is to provide a process for photopatterning a an ionic substrate.

Another object of the invention is to provide a process for etching an ionic substrate at a rapid etcing rate and which results in a smooth surface morphology.

A further object of this invention is to provide a process for the etching of ionic substrates by using a high-intensity light such as a laser, with or without a mask, to induce a fusion reaction.

Upon further study of the specification and appended claims, further objects and advantages of this invention will become apparent to those skilled in the art.

These objects have been achieved by providing a process for photopatterning a solid ionic substrate coated with a material which reacts with said substrate when in molten form comprising applying radiation effective to melt at least a portion of the substrate, whereby there results a reaction product which is soluble in at least one solvent in which the substrate is substantially less soluble.

In a preferred aspect, this invention relates to a process for etching a solid ionic substrate comprising:

(a) applying a layer of coating material to the surface of the substrate, said coating material capable of reacting with the substrate when in molten form, (b) selectively irradiating regions of the substrate surface to melt the substrate and form a reaction product at the irradiated regions, and (c) removing said reaction product with a solvent which does not substantially dissolve said substrate to form an etched pattern in the substrate surface.

These objects are preferably achieved by applying a layer of reactant salt to the surface of an ionic substrate and subsequently exposing the substrate surface to effective radiation, e.g., high-intensity light such as a laser, to induct melting at the surface of the substrate. The melting of the substrate permits the substrate and reactant salt to undergo a fusion reaction. Using a suitable solvent, the product of the fusion reaction can then be easily removed.

Thus, in the process of the invention the use of high-intensity light is not specifically for purposes of forming a chemically reactive species or for vaporizing a portion of the substrate surface as in the prior art. Instead, high-intensity light is used to induce or initiate a fusion reaction. The near surface of the substance is locally melted by high-intensity light permitting the reactant salt and the molten portion of the substrate to undergo a fusion reaction which produces a soluble reaction product.

This invention, however, is not limited to ionic substrates but is also applicable to any other solid for which radiation exits which will melt it and for which there are a wide variety of substances which will undergo fusion reactions with the solid under molten conditions. The resultant products will have a solubility in at least one solvent which is sufficiently different from that of the substrate to permit differential dissolution. A determination of effective wavelengths, coating substances and differential solvents can routinely be made for any substrate by reference to literature reporting the relevant properties of solid substrates and their fusion reactants, e.g., absorption spectra and solubilities of solids and coating agents. The latter can be chosen for a given substrate from known materials which react with the substrate under molten conditions.

The laser-induces fusion reaction process of the invention is especially suitable for etching ionic materials such as solid inorganic salts which undergo fusion reactions to produce soluble products. Exemplary ionic substrates are $LiTaO_3$ and $LiNbO_3$. Lithium niobate is of special interest since this is a preferred material in such applications as surface acoustic wave (SAW) devices, optical waveguides, and other photonic devices.

General processes for etching $LiNbO_3$ surfaces, as used for example in the formation of ridge waveguides, employ ion-driven techniques such as reactive ion etching and ion beam milling. These processes, however, are slow, having etch rates of about 0.01-0.05 $\mu m/min$ with a typical ion current density of $1mA/cm^2$. The process of the invention, on the other hand, can achieve etch rates for $LiNbO_3$ surfaces on the order of 10 $\mu m/min$ or greater.

In the process of the invention, the surface of the ionic substrate is coated with a layer of reactant salt, preferably a halide or a hydroxide. The reactant salt can be applied by any conventional process such as by evaporation of a concentrated solution or by direct application of salt crystals to the ionic substrate. Preferably, the reactant salt layer includes some amount of water since a hydrated layer will form a smoother, more optically uniform surface layer than one of crystalline form. The process of the invention may be performed under ambient conditions.

The reactant salt or other coating agent is chosen on the basis of the ability to undergo a fusion reaction with the molten substrate to form a soluble reaction product and on the basis of a suitable transparency to the wavelength used for locally melting the substrate surface. Transparency of the reactant salt, i.e, the ratio of the intensity of light transmitted to the intensity of incident light, is preferably greater than about 50%.

After application of the reactant salt layer, the next step involves spatially localized melting of the substrate surface by exposure to radiation which is sufficiently absorbed by the substrate to melt it, e.g., high-power-density intense light. For a substrate having a band gap, for example, photon energies in excess of the band gap of the substrate material can be used. Employment of photon energies in excess of the band gap confines power deposition to a shallow surface region of the sbustrate. For example, the band gap of $LiNbO_3$ is 4.0 eV so the wavelength of the high-intensity photon source should be less than about 310nm; in other words, where the source of radiation is a laser, the wavelength of light used to melt the substrate is less than about 310nm. Furthermore, the photon energy should be sufficiently low that the energy will be transmitted through the reactant salt layer. In other words, the wavelength of the photon source should not be one which the reactant salt will strongly absorb. For a $LiNbO_3$ substrate having a reactant salt layer of KF, a preferred wavelength is about 270nm. As for the substrate itself, it should possess a strong absorption for photons at the surface, preferably at least about $10^4/cm$.

The power density of the high intensity light source should at the minimum correspond to that which will melt the substrate surface. In the case of $LiNbO_3$, the power density should be at least about $10^6 W/cm^2$.

Due to the high-power density requirement of the photon source, it is preferable to use a pulsed laser rather than a continuous wave laser. Also, a continuous wave laser may degrade the resolution of the etch pattern due to thermal diffusion. However, a high-power, scanned continuous wave laser may reduce the effects of thermal diffusion and thus be suitable for the process of the invention.

The etch rate achieved by the process of the invention when using a pulser laser is generally dependent upon the power density per pulse as well as the number of pulses and their duration. At higher values of power density a faster etch rate will be achieved for a given number of pulses while at lower values of power density the etch rate is not as rapid but the resultant pattern on the etched surface will tend to be smoother. In comparison to prior art processes, the fusion etching process according to the invention can achieve substantially faster etching rates.

Fusion products produced by the reaction between the substrate and reactant salt should also be relatively transparent to the wavelength of light used to melt the substrate, e.g. a transparency of greater than about 50%. The formation of a reaction product which is transparent to the wavelength of light employed will permit the interface between the substrate and reaction product to advance deeper into the substrate with each laser pulse.

Suitable solvents for use in the process are those which can dissolve both the excess reactant salt remaining on the surface and the reaction product while being relatively inert with respect to the substrate. For example, in a process involving $LiNbO_3$ substrate material and KF as the reactant salt, complex niobium oxyfluoride anions, such as $NbO_5^-$, are produced by the fusion reaction. These reaction products are highly water soluble. Thus, due to the insolubility of $LiNbO_3$, the reaction products and excess potassium fluoride can be removed without affecting the substrate by simply rinsing the substrate in water. The substrate will thus only be etched at those portions of the surface which were melted by the laser radiation.

The radiation-driven fusion reaction process of the invention can be used to etch patterns on an ionic substrate material as small as about 11 micron in size, although submicron features may also be possible. The substrate can be exposed to the laser through a mask for broad patterning or alternatively the pattern can be directly written onto the substrate surface using a focused laser beam.

Typical layer thicknesses of the covering salt are in excess of about 100 μm. Of course, the layer must be sufficently thick to provide enough material to react with the substrate down to the desired etch depth.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degres Celsius and unless otherwise indicated, all parts and percentages are by weight.

The entire text of all applications, patents and publications, if any, cited above and below are hereby incorporated by reference.

EXAMPLE 1

Small crystals of KF are applied directly to the surface of a LiNbO$_3$ substrate. The entire process is conducted under ambient conditions. Using 270 nm light from a Quanta-Ray Nd-YAG-pumped frequency-doubled dye laser, the substrate was subjected to 120 pulses of 10 nsec duration, each having an energy per pulse of $7.5 \times 10^{-5}$ J, which corresponds to a power deposition of $4 \times 10^7$ W/cm$^2$. By rinsing with water to remove the fusion product, a 15-micron deep hole was produced in the substrate. Using a laser beam having an energy per pulse of $1.4 \times 10^{-4}$ J, corresponding to a power deposition of $8 \times 10^7$ W/cm$^2$, a 25-micron deep hole was produced under the same conditions. A comparison of etching rates for the process according to the invention to those of other etching processes are presented in Table 1.

TABLE 1

| LiNbO$_3$ Etching Rates (Microns/Min) | |
|---|---|
| Etching Technique | Etching Rates |
| Plasma Etching | 0.007 |
| Sputter Etching | 0.0083 |
| Ion Milling | 0.025 |
| Reactive Ion Etching | 0.05 |
| Ultrasonic Impact Grinding | 6.3 |
| Laser-Driven Fusion Etching (LDFE) | 12.5 at a power deposition of $8 \times 10^7$ W/cm$^2$ |
| | 7.5 at a power deposition of $4 \times 10^7$ W/cm$^2$ |

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for etching a solid ionic substrate comprising:
   (a) applying a layer of coating material to a surface of said substrate, said coating material capable of reacting with said substrate when said substrate is in molten form,
   (b) selectively irradiating regions of said substrate surface to melt at least a portion of said substrate and form a fusion reaction product at the irradiated regions, and
   (c) removing said fusion reaction product and any excess coating material from said surface of said substrate by dissolving said fusion reaction product and said excess coating material with a solvent which does not substantially dissolve said substrate to thereby form an etched pattern in said substrate surface.

2. A process according to claim 1, wherein said substrate in LiNbO$_3$ or LiTaO$_3$.

3. A process according to claim 1, wherein said coating material is a halide salt or a hydroxide salt.

4. A process according to claim 1, wherein said substrate is LiNbO$_3$ and said coating material is a fluoride salt.

5. A process according to claim 4, wherein said coating material is KF.

6. A process according to claim 5, wherein the source of radiation is a laser and the wavelength of light from said laser used to melt said substrate is less than about 310 nm.

7. A process according to claim 6, wherein said wavelength of light used to melt said substrate is about 270 nm.

8. A process according to claim 5, wherein said fusion reaction product and any excess KF from the surface of said substrate are removed by dissolution in water.

9. A process according to claim 1, wherein said coating material has a transparency of at least about 50% with respect to the wavelength of radiation used for melting said substate.

10. A process according to claim 1, wherein said fusion reaction product has a transparency of at least about 50% with respect to the wavelength of radiation used for melting said substrate.

11. A process according to claim 1, wherein the surface of said substrate has an absorbance of at least about $10^4$/cm with respect to the wavelength of radiation used for melting said substrate.

12. A process according to claim 1, wherein the source of radiation is a laser.

13. A process according to claim 12, wherein said laser is a pulsed laser.

14. A process according to claim 9, wherein said substrate is LiNbO$_3$ and the power deposition of said laser is at least about $10^6$ W/cm$^2$.

15. A process according to claim 1, wherein said coating material and said substrate are exposed to radiation through a mask.

16. A process according to claim 1, wherein said process is performed under ambient conditions.

* * * * *